Patented Mar. 23, 1943

2,314,362

UNITED STATES PATENT OFFICE 2,314,362

TERMITE CONTROL

Lindley E. Mills, Midland, Mich., assignor to The Dow Chemical Company, Midland, Mich., a corporation of Michigan No Drawing. Application February 23, 1942, Serial No. 431,905

8 Claims. (Cl. 117—147)

This invention is concerned with a procedure for protecting wood against the attack of termites and the article thereby obtained.

Fluorides, chromates, creosote, borax, polychlorophenols, cresols, naphthols, and many other inorganic and organic materials have been employed for the protection of wood and wood products against attack by animal, plant, and bacterial organisms. In many instances, such treatment accomplishes the desired end, but in others satisfactory results are not always obtained. The latter situation prevails with respect to termite proofing wood, and particularly in connection with the protection of structural timbers, such as are exposed to weathering or contacted with the soil.

Many of the commercially developed toxicants do not provide adequate protection for wood against termite attack either by reason of low toxicity or impermanence of the toxicant itself, or because of improper methods of application. Thus, the dipping of planks, window sash, and timbers in solutions of inorganic salts, phenolates, creosote, or phenols may protect the surface from attack by molds and the like, but does not prevent the entry of termites into the interior of the treated article and its eventual destruction. Also such preservatives as borax, zinc salts, and phenolates are sufficiently water-soluble as to be rapidly leached out of wood on contact with rain, dew, or moist soil surfaces. A further disadvantage accruing to many known toxicants lies in their relatively low solubility in the non-aqueous solvents commonly employed for wood treatment. In certain instances sufficient of an otherwise satisfactory toxicant cannot be dissolved in the preferred solvents to produce an efficient treating solution.

It is among the objects of the present invention to provide an improved procedure for the termite-proofing of wood and wooden articles. A further object contemplates the provision of wood and wooden products so processed as to be resistant to the attack of termites over a relatively long period of time.

According to the present invention wood is impregnated with hexachloro-cyclohexadiene-1,4-one-3 dissolved in a suitable organic solvent such as fuel oil, petroleum distillates, chlorinated benzenes, naphtha, chlorinated aliphatic hydrocarbons, ketones, ethers, aliphatic hydrocarbons, et cetera, to obtain a product resistant to attack and decay. Hexachloro-cyclohexadiene-1,4-one-3 is a yellow crystalline compound melting at 106°–107° C. and having the formula

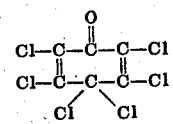

This compound may be prepared by the direct chlorination of phenol in the presence of a catalytic amount of antimony trichloride. It is readily soluble in the solvents commonly used in wood impregnation in amounts substantially in excess of those required to accomplish the desired termite control. Wood impregnated with solutions of the compound are protected against termite attack for a much longer period of time than is the case with many other organic and inorganic toxicant materials by reason of the fact that hexachloro-cyclohexadiene-1,4-one-3 has a very low solubility in water and particularly waters of alkaline reaction so that it is not readily leached out of the wood.

The impregnation with the toxicant solution is carried out under such conditions of elevated temperature and pressure as results in the dispersion of the toxicant throughout the mass of the treated wooden article. One convenient mode of operation comprises first introducing the wood into a zone of reduced pressure whereby air is withdrawn from the interstices of the cellulosic structure. This is readily accomplished by placing the wood in an air-tight chamber and evacuating the chamber. The so-treated wood is then immersed in the impregnating solution under pressure and at elevated temperature whereby the toxicant passes into and is distributed through the body of the article. A like result may be obtained by simple pressure impregnation at elevated temperatures without the preliminary evacuation of the wood, although a longer period of time and higher pressures may be required.

The per cent by weight of hexachloro-cyclohexadiene-1,4-one-3 employed in the treating solution varies with the specific gravity of the solvent employed, the porosity of the wood, and the amount of toxicant it is desired to deposit in the wood. Thus, in a solvent of low specific gravity a higher per cent of toxicant may be required than in a heavy solvent. Where a very porous wood is to be protected, a relatively low percentage of toxicant is suitable by reason of the comparatively large volume of treating solution ultimately absorbed by the wood. Also some woods are naturally more resistant to termite attack than others whereby the amount of toxicant may be reduced. In the absence of a supplementary toxicant, it appears that at least 0.25 pound of hexachloro-cyclohexadiene-1,4-one-3 per cubic foot of wood is required for the long term protection of wood under optimum conditions for termite attack. The concentration of the toxicant in the treating fluid may well be regulated so as to deposit at least this proportion of the toxicant in the impregnated article.

While 0.25 pound of toxicant per cubic foot of wood is recommended as the lower practical concentration, it is to be understood that this represents the amount required to protect wood from attack by termites over a period of several years and under optimum conditions for attack. Somewhat lower concentrations are operable in localities where optimum conditions for termite attack do not exist, where there is no necessity for protecting the wood over such a long period, where a supplementary toxicant is employed, or where the solvent also exerts a toxic effect.

The upper limit as regards ratio of toxicant to wood is a matter of economy dictated in part by the ability of wood to retain the toxicant and the period for which protection is desired. A further factor to be considered in this connection is the fact that high concentrations of hexachloro-cyclohexadiene-1,4-one-3 in wood over a long period of time appear to react chemically with the wood to cause its disintegration. For most practical purposes it has been found advisable not to exceed 2 pounds of toxicant per cubic foot of wood.

The pressure employed during impregnation may vary from a few pounds to several hundred pounds per square inch depending upon the nature of the apparatus employed, whether or not the wood has been previously evacuated, the porosity of the wood, the degree of penetration required, the temperature of operation, and the viscosity of the treating solution. A pressure of from about 100 to 200 pounds per square inch is generally adequate, particularly where the wood has been subjected to a preliminary evacuation. The temperature of treatment appears to have an effect upon the rate at which the treating solution is absorbed by the wood, and it has been found that the time of treatment can be shortened considerably by operating at temperatures of above 60° C. In any event the temperature should be so controlled as not to cause decomposition of either the toxicant or the carrier solvent.

A preferred embodiment of the invention resides in the impregnation of wood with solutions of hexachloro-cyclohexadiene-1,4-one-3 in petroleum products such as fuel oil, crude oil, kerosene, light naphthas, et cetera. Where crude oil or fuel oil are used as a carrier, the oil itself remains in the wood and contributes to the termite resistant property of the finished articles. Such materials as naphtha, kerosene, and the low boiling organic solvents evaporate out of the wood at least in part to leave a residue of toxicant, and may be recovered, if desired, following the impregnation.

The time required to accomplish the desired degree of penetration is in part dependent upon the cross section and porosity of the wooden article under treatment. Generally from about 2 to 8 hours of treatment at between 60° and 100° C., and at a pressure of from 100 to 200 pounds per square inch give adequate penetration of timbers and planks previously subjected to evacuation.

If desired, other toxicants may be employed in conjunction with the hexachloro-cyclohexadiene-1,4-one-3. These toxicants must be non-reactive with the hexachloro-cyclohexadiene-1,4-one-3 and soluble in organic solvents. Representative of such materials are pentachlorophenol, naphthol, wood tar creosote, cresylic acid, et cetera.

The following examples are illustrative.

*Example 1*

Series of impregnations were conducted in which a crude fuel oil was employed as a carrier for hexachloro-cyclohexadiene-1,4-one-3. The fuel oil was obtained as a still residue from the stripping of crude oil and has a specific gravity of 0.90 at 60°/60° F., a boiling range of 462°–760° F. (90 per cent), and a flash point of 195° F. In each impregnation 10 yellow pine sapwood blocks 2 x 4 x 24 inches in size were weighed, placed in an evacuation chamber, and the chamber evacuated to an average pressure of 1 inch of mercury for a period of 2 hours. The fuel oil solution of hexachloro-cyclohexadiene-1,4-one-3 was then pumped into the evacuated chamber under a pressure of 150 pounds per square inch. The chamber and contents were heated to a temperature of 80° C. and maintained at 150 pounds pressure for 2.5 hours to complete the impregnation. The excess treating fluid was then drained off and the blocks weighed to determine the amount of toxicant and carrier absorbed.

One series of blocks treated with a 2.36 per cent by weight solution of hexachloro-cyclohexadiene-1,4-one-3 was found to have absorbed 0.59 pound of toxicant and 24.2 pounds of fuel oil per cubic foot of wood treated. A second series absorbed 1.6 pounds of hexachloro-cyclohexadiene-1,4-one-3 and 32.4 pounds of fuel oil per cubic foot from a solution containing 4.72 per cent by weight of toxicant. A third group of blocks absorbed 2.02 pounds of hexachloro-cyclohexadiene-1,4-one-3 and 19.4 pounds of fuel oil per cubic foot when treated with a solution containing 9.44 per cent by weight of toxicant. The treated blocks were stored for several weeks and thereafter partly buried in soil known to be heavily infested with termites in representative subtropical locations. The blocks were installed in the test plot in an upright position with ½ to ⅓ of each block exposed to weathering. The blocks were inspected after 1, 2, 3, and 5 years exposure to determine their comparative resistance to termite attack and decay but were otherwise undisturbed over the exposure period.

All of the blocks treated with the toxicant solution were found free of termite attack and decay after five years. The presence of the toxicant in the concentrations employed appeared to have no undesirable effect upon the cellulosic structure of the test blocks other than to impart a red-brown color thereto. Untreated blocks buried in the same test plots were found to have been destroyed to the extent of 75 per cent in one year, 87 per cent in two years, 92 per cent in three years, and 95–100 per cent in five years with only a trace of heart wood remaining.

*Example 2*

An analogous series of determinations were made in which there was substituted for the fuel oil shown in Example 1, a petroleum naphtha having a specific gravity of 0.73 at 60°/60° F., a boiling range of 300°-400° F. and a flash point of 102° F. Four series of blocks were impregnated with solutions containing 2.87, 5.74, 11.48, and 22.96 per cent by weight of hexachloro-cyclohexadiene-1,4-one-3. These blocks absorbed 0.67, 1.3, 2.73, and 5.4 pounds of hexachloro-cyclohexadiene-1,4-one-3 and 22.7, 21.3, 21.1, and 18.1 pounds of naphtha per cubic foot of wood, respectively. A comparative series of blocks were impregnated with naphtha alone and absorbed 25.2 pounds per cubic foot.

After 5 years in the termite infested soil, all of the blocks containing the hexachloro-cyclohexadiene-1,4-one-3 were found to be substantially free from termite attack. The blocks containing 5.4 and 2.73 pounds of toxicant per cubic foot were partly disintegrated due, apparently, to the reaction of toxicant with the wood to break down the lignocellulosic structure. The blocks containing the lower concentration of toxicant were red-brown in color but did not appear to have been adversely affected as were those containing the higher percentages of treating material. From the periodic inspections, it appeared that the disintegration of these blocks took place between 3 and 4 years from the time of impregnation. Control blocks treated with naphtha alone showed 20 per cent significant termite entry in one year and 70 per cent destruction in 5 years.

Example 3

Similar treatments were carried out with crude oil solutions of hexachloro-cyclohexadiene-1,4-one-3 in the treatment of heavy yellow pine planking. The impregnated planks were exposed to attack by both termite and toredo and were found to display substantially the same degree of resistance as described above for the yellow pine blocks.

I claim:

1. A method for protecting wood against attack by termites which comprises pressure impregnating the wood with hexachloro-cyclohexadiene-1,4-one-3 as an active toxicant dissolved in an organic solvent.

2. A method for protecting wood against attack by termites which comprises pressure impregnating the wood with hexachloro-cyclohexadiene-1,4-one-3 as an active toxicant dissolved in an organic solvent, the concentration of the hexachloro-cyclohexadiene-1,4-one-3 in the solution being such that between 0.25 and 2.0 pounds of the toxicant is absorbed per cubic foot of wood.

3. The method for protecting wood against attack by termites which comprises the steps of withdrawing air from the wood by preliminary evacuation and pressure impregnating the evacuated wood with hexachloro-cyclohexadiene-1,4-one-3 as an active toxicant dissolved in an organic solvent.

4. A method for protecting wood against attack by termites which comprises the steps of withdrawing air from the wood by preliminary evacuation and pressure impregnating evacuated wood with hexachloro-cyclohexadiene-1,4-one-3 as an active toxicant dissolved in an organic solvent, the concentration of the treating solution being such that between 0.25 and 2 pounds of the toxicant is absorbed per cubic foot of wood.

5. A method for protecting wood against attack by termites which comprises the steps of withdrawing air from the wood by preliminary evacuation and pressure impregnating the wood with hexachloro-cyclohexadiene-1,4-one-3 as an active toxicant dissolved in a petroleum oil product.

6. Wood protected from termite attack having hexachloro-cyclohexadiene-1,4-one-3 dispersed throughout its mass.

7. Wood protected from termite attack having dispersed throughout its mass from 0.25 to 2.0 pounds of hexachloro-cyclohexadiene-1,4-one-3 per cubic foot.

8. Wood protected from termite attack having dispersed throughout its mass hexachloro-cyclohexadiene-1,4-one-3 dissolved in a petroleum oil product.

LINDLEY E. MILLS.